US011936422B2

(12) United States Patent
Kawai

(10) Patent No.: US 11,936,422 B2
(45) Date of Patent: Mar. 19, 2024

(54) SPECTRUM MONITORING APPARATUS, SUBMARINE APPARATUS, AND OPTICAL COMMUNICATION SYSTEM

(71) Applicant: NEC Corporation, Tokyo (JP)

(72) Inventor: Motoyoshi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 17/908,072

(22) PCT Filed: Mar. 4, 2021

(86) PCT No.: PCT/JP2021/008496
§ 371 (c)(1),
(2) Date: Aug. 30, 2022

(87) PCT Pub. No.: WO2021/177414
PCT Pub. Date: Sep. 10, 2021

(65) Prior Publication Data
US 2023/0096208 A1 Mar. 30, 2023

(30) Foreign Application Priority Data
Mar. 6, 2020 (JP) .................................. 2020-038561

(51) Int. Cl.
*H04B 10/075* (2013.01)
*H04J 14/02* (2006.01)

(52) U.S. Cl.
CPC ........ *H04B 10/075* (2013.01); *H04J 14/0227* (2013.01)

(58) Field of Classification Search
CPC ............................ H04B 10/075; H04B 10/079; H04B 10/0795; H04B 10/07957; H04J 14/0227
See application file for complete search history.

(56) References Cited

U.S. PATENT DOCUMENTS 6,262,822 B1 * 7/2001 Obhi .................... H04B 10/077
398/9
6,826,327 B1 * 11/2004 Lee ......................... G02F 1/125
385/28
(Continued)

FOREIGN PATENT DOCUMENTS

JP 3538800 * 4/2004 .............. H04J 14/00
JP 2011-077808 A 4/2011
(Continued)

OTHER PUBLICATIONS

International Search Report for PCT Application No. PCT/JP2021/008496, dated May 18, 2021.

*Primary Examiner* — Nathan M Cors
(74) *Attorney, Agent, or Firm* — Sughrue Mion, PLLC

(57) ABSTRACT

A variable optical BPF allows a signal light of a specified wavelength band in a signal light including reference signal lights to pass through. A light receiving unit outputs a level signal indicating a level of the signal light having passed through the variable optical BPF. A control unit refers to a wavelength table held in advance, instructs a wavelength band that passes through the variable optical BPF, and obtains a spectrum of the signal light having passed through the variable optical BPF using the wavelength table and the level signal. The control unit detects a wavelength drift between a center wavelength of the wavelength band instructed to the variable optical BPF to cause the reference signal lights to pass through and center wavelengths of peaks corresponding to the reference signal lights in the spectrum, and updates the wavelength table to corrects the detected wavelength drift.

7 Claims, 7 Drawing Sheets

(56) References Cited

U.S. PATENT DOCUMENTS

2004/0257640 A1* 12/2004 Yamaguchi ........ H04B 10/2916
                                                    359/334
2011/0076017 A1    3/2011 Midorikawa et al.
2012/0121256 A1    5/2012 Suzuki et al.
2018/0241472 A1    8/2018 Inada

FOREIGN PATENT DOCUMENTS

| JP | 2011-254309 A | 12/2011 |
| JP | 2012-105222 A | 5/2012 |
| JP | 2018-133720 A | 8/2018 |
| WO | 2017/033438 A1 | 3/2017 |

* cited by examiner

SPECTRUM MONITORING APPARATUS, SUBMARINE APPARATUS, AND OPTICAL COMMUNICATION SYSTEM

This application is a National Stage Entry of PCT/JP2021/008496 filed on Mar. 4, 2021, which claims priority from Japanese Patent Application 2020-038561 filed on Mar. 6, 2020, the contents of all of which are incorporated herein by reference, in their entirety.

TECHNICAL FIELD

The present invention relates to a spectrum monitoring apparatus, a submarine apparatus, and an optical communication system.

BACKGROUND ART

In a submarine optical communication system using a ROADM (Reconfigurable Optical Add/Drop Multiplexer) device, it is necessary to monitor the spectrum shape of a signal light during operation to grasp the signal quality of each channel of a WDM (Wavelength Division Multiplexing) signal. To satisfy these requirements, an optical channel monitor (OCM), which is a combination of a variable optical bandpass filter and a photodetector, as shown in IEC TR 62343-6-7, is generally used.

To input a signal light to an OCM for monitoring a spectrum, it is known that the signal light to be monitored is branched to the OCM by a wavelength selective switch or other devices (Patent Literatures 1 and 2). In this configuration, the wavelength selective switch is inserted into a path through which the signal light is transmitted. However, the wavelength separation accuracy of the wavelength selection switch is lowered due to aging or other reasons, and this leads to a wavelength shift. Therefore, it has been proposed to correct the wavelength shift of the wavelength selective switch based on the monitoring result in the OCM.

CITATION LIST

Patent Literature

[Patent Literature 1] Japanese Unexamined Patent Application Publication No. 2018-133720
[Patent Literature 2] Japanese Unexamined Patent Application Publication No. 2012-105222

SUMMARY OF INVENTION

Technical Problem

However, a MEMS (Micro electro-mechanical system) is mainly used as a variable optical bandpass filter included in the OCM. Therefore, when the MEMS is subjected to a long-term energizing operation, fatigue occurs in a component, such as a silicon beam, that performs a mechanical operation, and a wavelength drift in which the wavelength accuracy (filtering accuracy) decreases occurs. As a result, there is a problem that the monitoring accuracy of the signal light by the OCM is lowered.

Further, although it is possible to maintain the wavelength accuracy by providing a reference light source in the OCM to maintain the wavelength accuracy (filtering accuracy) of the MEMS, there is also a problem that the structure of the OCM becomes complicated and the power consumption increases.

The present invention has been made in view of the aforementioned circumstances and aims to correct a wavelength drift of a variable optical bandpass filter with a simple configuration in a spectrum monitoring apparatus.

Solution to Problem

An aspect of the present invention is a spectrum monitoring apparatus including: a variable optical bandpass filter configured to allow a signal light of a specified wavelength band in a signal light including a reference signal light to pass through, the signal light including the reference signal light being transmitted by an optical fiber included in a submarine optical cable into which a submarine apparatus is inserted; a light receiving unit configured to receive the signal light that has passed through the variable optical bandpass filter and output a level signal indicating a level of the received signal light; and a control unit configured to instruct a wavelength band that is allowed to pass through the variable optical bandpass filter by referring to a wavelength table held in advance, and obtain a spectrum of the signal light having passed through the variable optical bandpass filter by using the wavelength table and the level signal, in which the control unit: detects a wavelength drift between the center wavelength of the wavelength band instructed to the variable optical bandpass filter to allow the reference signal light to pass through and a center wavelength of a peak corresponding to the reference signal light in the spectrum; and updates the wavelength table to correct the detected wavelength drift.

An aspect of the present invention is a submarine apparatus including: an optical branching unit inserted into an optical fiber included in a submarine optical cable and configured to branch a part of a signal light including a reference signal light transmitted by the optical fiber; and a spectrum monitoring apparatus configured to monitor a spectrum of the signal light including the reference signal light branched by the optical branching unit, in which the spectrum monitoring apparatus includes: a variable optical bandpass filter configured to allow a signal light of a specified wavelength band in the signal light including the reference signal light to pass through; a light receiving unit configured to receive the signal light that has passed through the variable optical bandpass filter and output a level signal indicating a level of the received signal light; and a control unit configured to instruct a wavelength band that is allowed to pass through the variable optical bandpass filter by referring to a wavelength table held in advance, and obtain a spectrum of the signal light having passed through the variable optical bandpass filter by using the wavelength table and the level signal, in which the control unit: detects a wavelength drift between the center wavelength of the wavelength band instructed to the variable optical bandpass filter to allow the reference signal light to pass through and a center wavelength of a peak corresponding to the reference signal light in the spectrum; and updates the wavelength table to correct the detected wavelength drift.

An aspect of the present invention is an optical communication system including: a submarine optical cable connecting a first optical transmission apparatus and a second optical transmission apparatus; and a submarine apparatus inserted into the submarine optical cable, in which the submarine apparatus includes: an optical branching unit inserted into an optical fiber included in a submarine optical cable and configured to branch a part of a signal light including a reference signal light transmitted by the optical fiber; and a spectrum monitoring apparatus configured to monitor a spectrum of the signal light including the reference signal light branched by the optical branching unit, in which the spectrum monitoring apparatus includes: a variable optical bandpass filter configured to allow a signal light of a specified wavelength band in the signal light including the reference signal light to pass through; a light receiving unit configured to receive the signal light that has passed through the variable optical bandpass filter and output a level signal indicating a level of the received signal light; and a control unit configured to instruct a wavelength band that is allowed to pass through the variable optical bandpass filter by referring to a wavelength table held in advance, and obtain a spectrum of the signal light having passed through the variable optical bandpass filter by using the wavelength table and the level signal, in which the control unit: detects a wavelength drift between the center wavelength of the wavelength band instructed to the variable optical bandpass filter to allow the reference signal light to pass through and a center wavelength of a peak corresponding to the reference signal light in the spectrum; and updates the wavelength table to correct the detected wavelength drift.

Advantageous Effects of Invention

According to the present invention, it is possible to correct a wavelength drift of a variable optical bandpass filter with a simple configuration in a spectrum monitoring apparatus.

EXAMPLE EMBODIMENT

Figure 1:
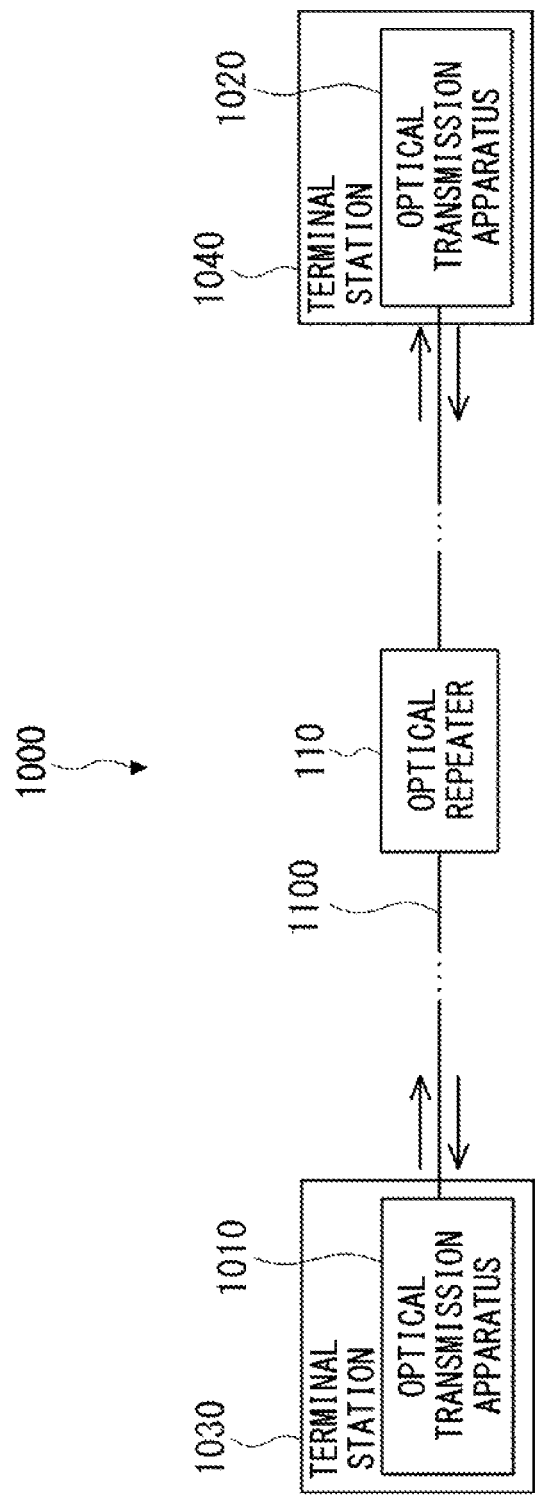
FIG. 1 is a diagram showing a basic configuration of an optical communication system including a spectrum monitoring apparatus according to a first example embodiment.

Example embodiments of the present invention will be described below with reference to the drawings. The same components are denoted by the same reference numerals throughout the drawings, and a repeated explanation is omitted as needed.

First Example Embodiment

A spectrum monitoring apparatus according to a first example embodiment will be described. The spectrum monitoring apparatus according to the present example embodiment is provided in an apparatus such as an optical repeater, an optical branch/insertion apparatus, and a ROADM apparatus, which is inserted into an optical cable containing a plurality of optical fibers and connects a plurality of optical transmission apparatuses provided in a plurality of terminal stations. This optical cable is, for example, a submarine optical cable laid on the seabed, and in this case, the spectrum monitoring apparatus is provided in a submarine apparatus such as an optical repeater, an optical branch/insertion apparatus, and a ROADM apparatus.

In the following description, it is assumed that a spectrum monitoring apparatus 100 according to the first example embodiment is provided in an optical repeater 110. The spectrum monitoring apparatus 100 is not limited to being mounted on the optical repeater, and it may be mounted on various optical apparatuses such as an optical branch/insertion apparatus and a ROADM apparatus.

FIG. 1 shows a basic configuration of an optical communication system 1000 including the spectrum monitoring apparatus 100 according to the first example embodiment. The optical communication system 1000 includes an optical transmission apparatus 1010 provided in one terminal station 1030, an optical transmission apparatus 1020 provided in the other terminal station 1040, an optical cable 1100, and the optical repeater 110. The terminal stations 1030 and 1040 are provided, for example, as landing stations of a submarine optical cable.

The optical transmission apparatus 1010 and the optical transmission apparatus 1020 are connected by the optical cable 1100 containing a plurality of optical fibers. The optical transmission apparatuses 1010 and 1020 are provided with one or more transponders capable of transmitting and receiving signal lights, an optical multiplexer/demultiplexer circuit, and other components, and are configured to perform bidirectional optical communication through the optical cable 1100.

The optical repeater 110 is inserted into the optical cable 1100 to amplify a signal light attenuated by transmission.

Figure 2:
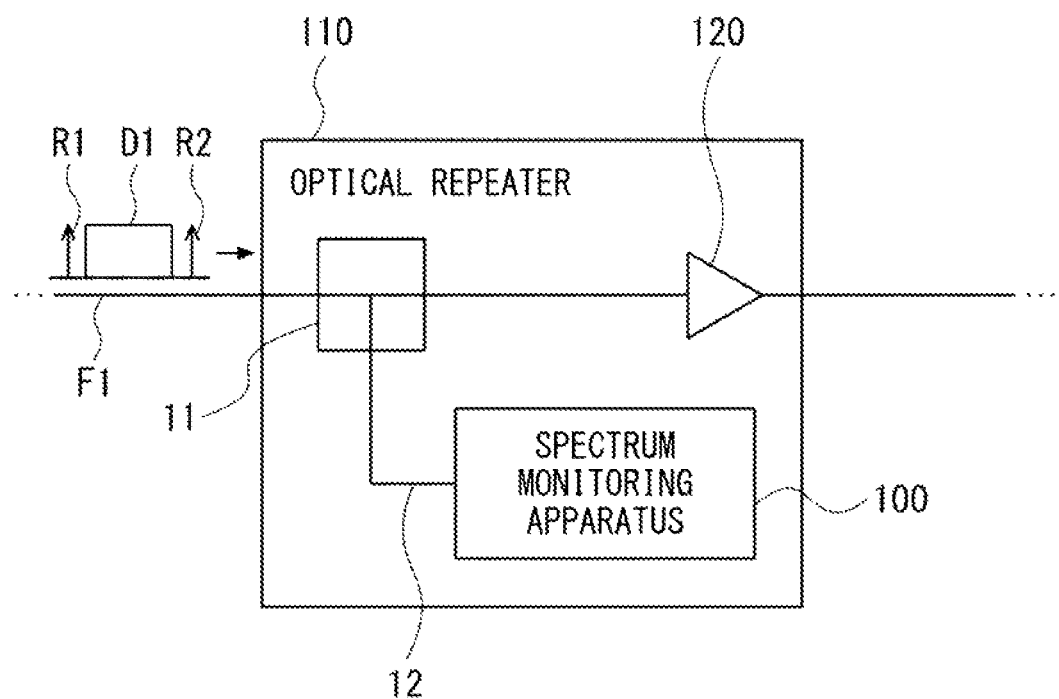
FIG. 2 is a diagram schematically showing a configuration of an optical repeater according to the first example embodiment.

Next, a configuration of the optical repeater 110 according to the first example embodiment will be described. FIG. 2 schematically shows the configuration of the optical repeater 110 according to the first example embodiment. In FIG. 2, only an optical fiber F1 in the optical fibers contained in the optical cable 1100 is represented for simplification of the drawing and description. The optical fiber F1 is used for communication in a downlink direction from the optical transmission apparatus 1010 to the optical transmission apparatus 1020.

An optical branching unit 11 for branching an input signal light into two is inserted into the optical fiber F1. The optical branching unit 11 may be configured, for example, as an optical coupler such as a Y-branch having one input and two outputs.

The optical transmission apparatus 1010 outputs a signal light D1 modulated according to communication data, a reference signal light R1 having a wavelength $\lambda 1$ shorter than that of the signal light D1, and a reference signal light R2 having a wavelength $\lambda 2$ longer than that of the signal light D1 to the optical repeater 110 through the optical fiber F1. Here, the wavelength of the reference signal light means the center wavelength of the reference signal light.

The reference signal light R1 is sinusoidally modulated at a frequency f1. The reference signal light R2 is sinusoidally modulated at a frequency f2 different from the frequency f1.

The signal light D1, the reference signal light R1, and the reference signal light R2 output from the optical transmission apparatus 1010 are input to the optical branching unit 11 through the optical fiber F1. The optical branching unit 11 branches the signal light D1 and the reference signal lights R1 and R2 to the optical fiber F1 and an optical transmission line 12.

The spectrum monitoring apparatus 100 receives the signal light D1 and the reference signal lights R1 and R2 through the optical transmission line 12.

In the optical repeater 110 that is an example of a submarine apparatus, an optical amplifier may be inserted into the optical fiber F1, for example, to compensate for attenuation of the signal light transmitted by the optical fiber F1. In FIG. 2, an optical amplifier 120 is provided as an example.

The optical amplifier 120 is configured, for example, as an erbium-doped fiber amplifier (EDFA). The EDFA amplifies the signal light by outputting an excitation light from an excitation light source to an erbium-doped fiber (EDF) to excite it, and inputting the signal light to the EDF to amplify it. The optical amplifier 120 amplifies the input light and outputs the amplified light to the optical transmission apparatus 1020 through the optical fiber F1.

Figure 3:
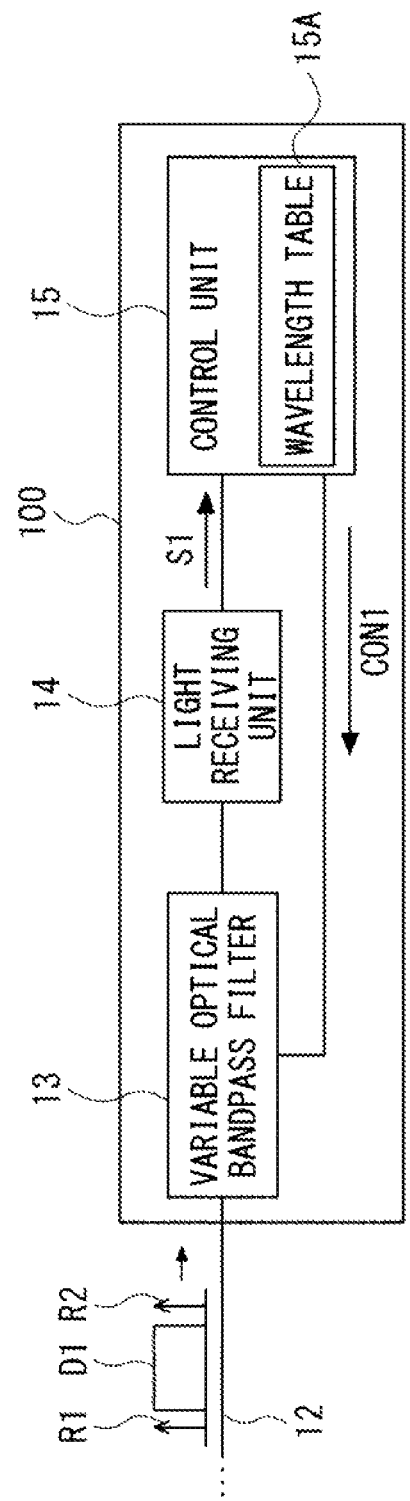
FIG. 3 is a diagram schematically showing a configuration of the spectrum monitoring apparatus according to the first example embodiment.

Next, a configuration of the spectrum monitoring apparatus 100 will be described. FIG. 3 schematically shows the configuration of the spectrum monitoring apparatus 100 according to the first example embodiment. The spectrum monitoring apparatus 100 includes a variable optical bandpass filter (BPF) 13, a light receiving unit 14, and a control unit 15.

The signal light D1, the reference signal light R1, and the reference signal light R2 branched to the optical transmission line 12 are input to the variable optical bandpass filter 13. The variable optical bandpass filter 13 sweeps a wavelength band of the signal light that is allowed to pass through within the entire wavelength band of the received signal light in response to a control signal CON1 output from the control unit 15. For example, the wavelength band of the signal light that is allowed to pass through the variable optical bandpass filter 13 is changed from a short wavelength to a long wavelength.

The light receiving unit 14 is, for example, a photodiode, and outputs a level signal S1 indicating a level (intensity) of the signal light output from the variable optical bandpass filter 13 to the control unit 15. Since the variable optical bandpass filter 13 sweeps the wavelength band of the signal light that is allowed to pass through, the wavelength band of the signal light received by the light receiving unit 14 changes according to the sweep.

The control unit 15 refers to a wavelength table 15A held in advance, outputs the control signal CON1 to the variable optical bandpass filter 13 to control the sweep of the wavelength band, and receives the level signal S1 output from the light receiving unit 14. Thus, the level (intensity) of the signal light can be obtained for each wavelength band (i.e., the center wavelength) having passed through the variable optical bandpass filter 13. Thereby, a spectrum SP in all wavelength bands of the signal light D1, the reference signal light R1 and R2 is obtained.

The wavelength table 15A may be stored in a memory or the other devices provided in the control unit 15, or may be stored in a memory or other devices provided separately from the control unit 15. In either case, the control unit 15 is configured to be capable of reading necessary information from the wavelength table 15A and writing necessary information into the wavelength table 15A.

The control unit 15 is configured to detect a wavelength drift of the variable optical bandpass filter 13 with reference to the spectrum SP, and to update the wavelength table 15A held therein for correcting the detected wavelength drift.

Since the reference signal lights R1 and R2 are sinusoidally modulated, the control unit 15 can detect the modulated signal to specify the peaks corresponding to the reference signal lights R1 and R2 in the spectrum SP.

Figure 4:
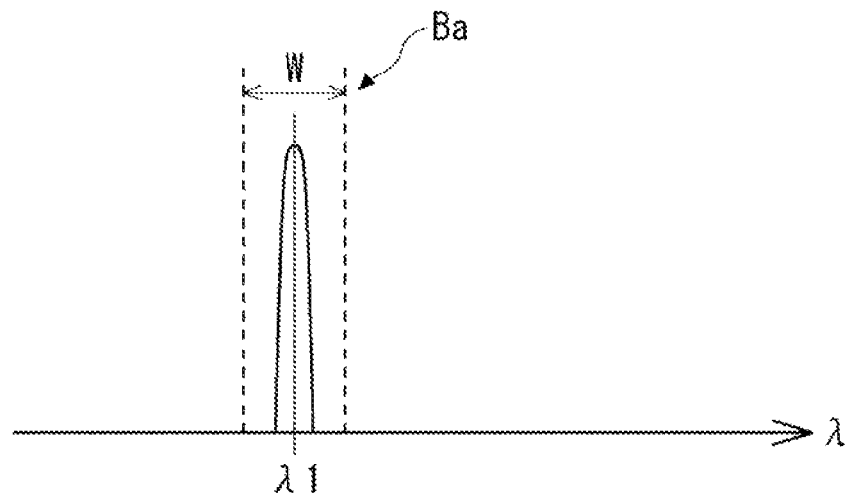
FIG. 4 is a diagram showing a spectrum when no wavelength drift occurs in a variable optical bandpass filter.

Hereinafter, a wavelength drift correction operation of the spectrum monitoring apparatus 100 will be described with focusing on the reference signal light R1. FIG. 4 is a diagram showing a spectrum when no wavelength drift occurs in the variable optical bandpass filter 13. When the control unit 15 specifies a band Ba having the center wavelength λ1 and a width W as the wavelength band passing through the variable optical bandpass filter 13, the reference signal light R1 passes through the variable optical bandpass filter 13 as shown in FIG. 4. When no wavelength drift occurs, the peak of the reference signal light R1 appears at the center wavelength λ1 in the spectrum SP obtained by the control unit 15.

Figure 5:
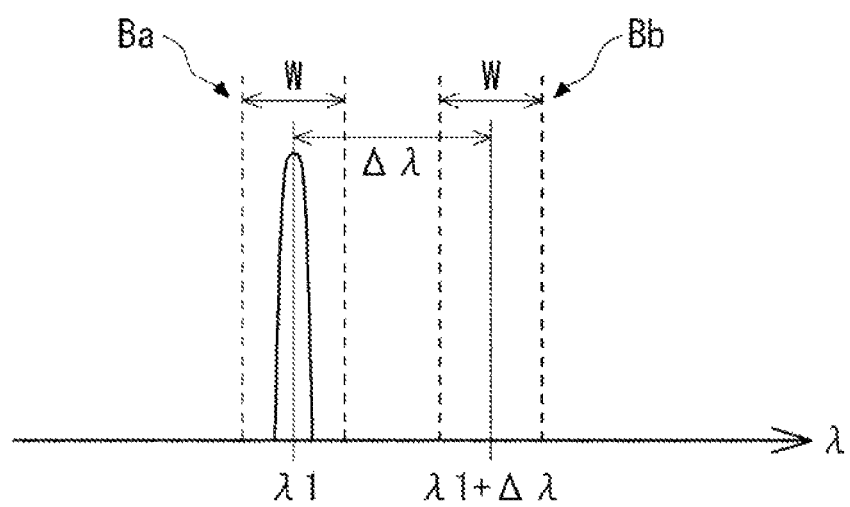
FIG. 5 is a diagram showing a spectrum when a wavelength drift occurs in the variable optical bandpass filter.

Next, a case where a wavelength drift occurs in the variable optical bandpass filter 13 will be described. FIG. 5 is a diagram showing a spectrum when a wavelength drift Δλ occurs in the variable optical bandpass filter 13. Even if the control unit 15 specifies the wavelength band Ba as the wavelength band passing through the variable optical bandpass filter 13 in a state where the wavelength drift Δλ occurs, the wavelength band Bb deviated from the wavelength band Ba by the wavelength drift Δλ is set to the variable optical bandpass filter 13.

Therefore, in the spectrum SP obtained by the control unit 15, there is no peak of the reference signal light R1 that should appear at the position of the center wavelength λ1.

On the other hand, in the present configuration, since the wavelength band passing through the variable optical bandpass filter 13 is swept, the reference signal light R1 passes through the variable optical bandpass filter 13 when the wavelength band having the center wavelength different from the wavelength λ1 by the wavelength drift Δλ is set to the variable optical bandpass filter 13. Therefore, in the spectrum SP obtained by the control unit 15, the peak of the reference signal light R1, which should normally stand at the position of the center wavelength λ1, stands at the position of the center wavelength λ1-Δλ.

Figure 6:
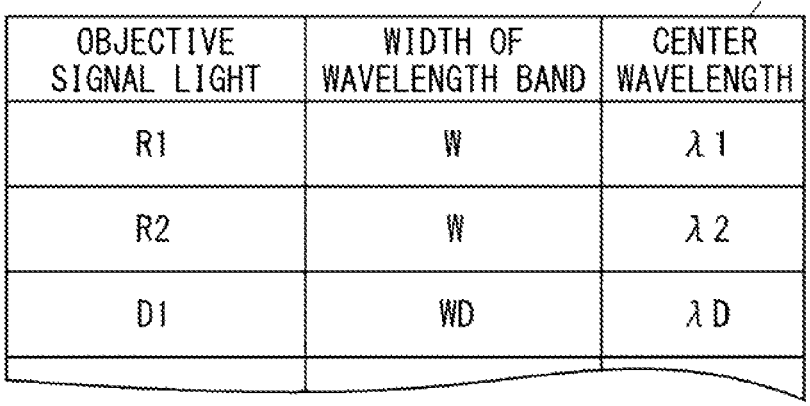
FIG. 6 is a diagram showing an example of a wavelength table before and after an update.

By referring to the spectrum SP, the control unit 15 updates the center wavelength of the wavelength band that is defined in the wavelength table 15A and set to the variable optical bandpass filter 13 to allow the reference signal light R1 to pass through the variable optical bandpass filter 13 from λ1 to λ1-Δλ. FIG. 6 shows an example of the wavelength table 15A before and after the update. After the update, the wavelength drift is corrected by setting λ1-Δλ as the center wavelength of the wavelength band for allowing the reference signal light R1 to pass through, and can allow the reference signal light R1 having the center wavelength λ1 to actually pass through.

Further, the control unit 15 can also update the center wavelength of the wavelength band included in the wavelength table 15A for allowing the wavelengths of other signal lights including the signal light D1 to pass through to values changed by Δλ.

Since the wavelength drift correction of the reference signal light R2 can be performed in the same manner as that of the reference signal light R1, a detailed description thereof will be omitted.

As described above, according to the present configuration, it is possible to realize the spectrum monitoring apparatus capable of maintaining a monitoring accuracy of a spectrum shape by correcting the wavelength drift of the variable optical bandpass filter 13.

Further, in the present configuration, since it is not necessary to provide a reference light source in the spectrum monitoring apparatus, the complexity of the configuration can be avoided. Further, since the configuration can be simplified, it is advantageous from the viewpoint of suppressing power consumption.

The wavelength drift correction may be performed continuously or intermittently. When the wavelength drift correction is performed intermittently, a pause period is provided so that the life of the spectrum monitoring apparatus can be extended and the required level of reliability for the mounted components can be relaxed.

Second Example Embodiment

Figure 7:
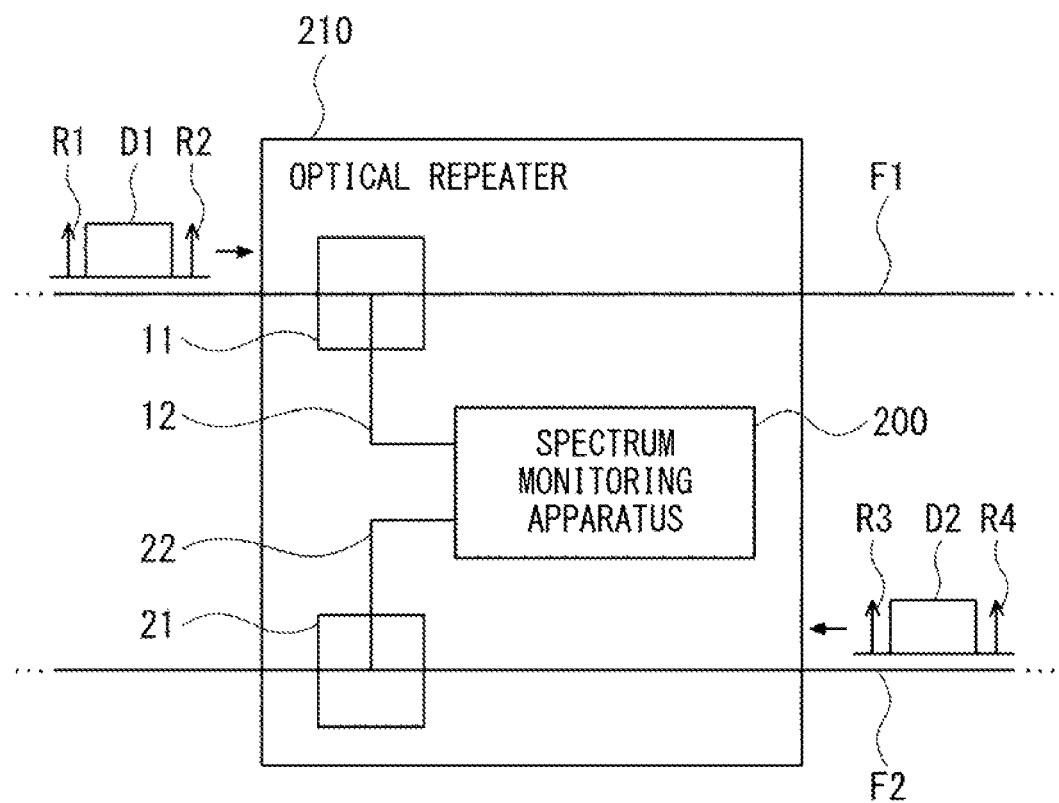
FIG. 7 is a diagram schematically showing a configuration of an optical repeater according to a second example embodiment.

In the first example embodiment, the configuration having the optical fiber used for the downlink communication has been described. In contrast, in the present example embodiment, a configuration having an optical fiber pair used for downlink communication and uplink communication will be described. FIG. 7 schematically shows a configuration of an optical repeater 210 according to the second example embodiment. The optical repeater 210 includes the optical fibers F1 and F2, the optical branching unit 11, an optical branching unit 21, the optical transmission line 12, an optical transmission line 22, and 22, and a spectrum monitoring apparatus 200. In FIG. 7, other configurations including the optical amplifier 120 are omitted for simplification of the description.

The optical fiber F1 is an optical fiber used for downlink communication from the optical transmission apparatus 1010 to the optical transmission apparatus 1020 as in the first example embodiment. An optical fiber F2 is an optical fiber used for upstream communication from the optical transmission apparatus 1020 to the optical transmission apparatus 1010. The spectrum monitoring apparatus 200 is inserted into the optical fibers F1 and F2.

The optical transmission apparatus 1010 outputs the data signal light D1 modulated according to the communication data and the reference signal lights R1 and R2 to the spectrum monitoring apparatus 200 of the optical repeater 210 through the optical fiber F1.

The optical transmission apparatus 1020 outputs a signal light D2 modulated according to the communication data, a reference signal light R3 having a wavelength λ3 shorter than that of the signal light D2, and a reference signal light R4 having a wavelength λ4 longer than that of the signal light D2 to the spectrum monitoring apparatus 200 of the optical repeater 210 through the optical fiber F2.

The signal light D2, the reference signal light R3, and the reference signal light R4 output from the optical transmission apparatus 1020 are input to the optical branching unit 21 through the optical fiber F2. Like the optical branching unit 11, the optical branching unit 21 inserted into the optical fiber F2 is configured to branch the input signal light into two. As shown in FIG. 7, the optical branching unit 21 branches the signal light D2 and the reference signal lights R3 and R4 to the optical fiber F2 and the optical transmission line 22.

Figure 8:
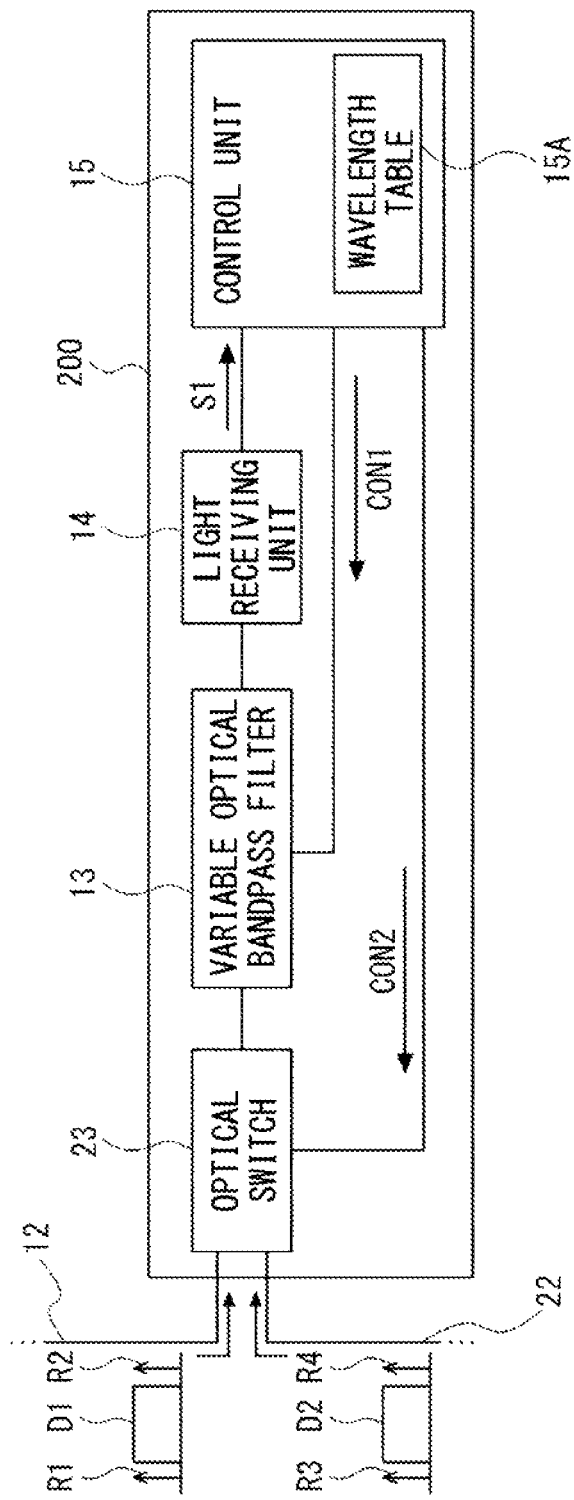
FIG. 8 is a diagram schematically showing a configuration of a spectrum monitoring apparatus according to the second example embodiment.

FIG. 8 schematically shows a configuration of the spectrum monitoring apparatus 200 according to the second example embodiment. The spectrum monitoring apparatus 200 has a configuration in which an optical switch 23 is added to the spectrum monitoring apparatus 100.

The optical switch 23 is an optical switch having two inputs and one output, and is inserted into the optical transmission lines 12 and 22. By outputting a control signal CON2 to the optical switch 23, the control unit 15 can select one of the optical transmission lines 12 and 22 as the input path of the signal light to the variable optical bandpass filter 13.

The case where the reference signal lights R1 and R2 are input to the variable optical bandpass filter 13 through the optical switch 23 is the same as that of the spectrum monitoring apparatus 100, and a description thereof will be omitted.

A case where the reference signal lights R3 and R4 are input to the variable optical bandpass filter 13 through the optical switch 23 will be described. In this case, the signal light D2 and the reference signal lights R3 and R4 branched to the optical transmission line 22 are input to the variable optical bandpass filter 13 through the optical switch 23. That is, the spectrum monitoring apparatus 200 can receive not only the reference signal lights R1 and R2 transmitted by the optical fiber F1 but also the reference signal lights R3 and R4, and can correct the wavelength drift by using the reference signal lights R3 and R4. The wavelength drift correction using the reference signal lights R3 and R4 is the same as the wavelength drift correction using the reference signal light R1, and therefore the description thereof is omitted.

In the present configuration, the reference signal light may be transmitted only by either the uplink or the downlink. In this case, compared with the case of transmitting the reference signal light in both the uplink and downlink, it is possible to reduce the number of components such as a light source and a modulator for outputting the reference signal light. Further, since the optical switch 23 is provided, the transmission of the reference signal light can be switched between the upstream line and the downstream line as necessary.

Thus, the wavelength drift can be corrected by transmitting the reference signal light by either or both of the uplink and downlink. By controlling the optical switch 23 after correcting the wavelength drift, spectrum monitoring of both the uplink and downlink can be performed by one spectrum monitoring apparatus.

Although the example in which the optical switch 23 is configured as a two-input/one-output optical switch has been described above, it is also possible to correct the wavelength drift by transmitting the reference signal light by all or part of three or more optical fibers by setting the number of input ports of the optical switch to three or more. For example, it is possible to perform spectrum monitoring of two fiber pairs when using an optical switch with four-input/one-output, and spectrum monitoring of four pairs of fibers when using an optical switch with eight-input/one-output by one spectrum monitoring apparatus.

Other Example Embodiments

The present invention is not limited to the above-described example embodiments, and can be modified as appropriate without departing from the scope of the invention. For example, the optical transmission line provided in the optical repeater may be an optical fiber or any optical transmission line such as a quartz waveguide other than the optical fiber.

Although the optical repeater as an example of a submarine apparatus has been described in the above embodiment, the spectrum monitoring apparatus described above can also be applied to other submarine apparatuses such as an optical branching apparatus and a ROADM apparatus.

In the above embodiment, although the reference signal light is described as being sinusoidally modulated, the reference signal light can be modulated by any modulation method as long as the control unit can identify the reference signal light.

In the above-described embodiment, although the spectrum monitoring apparatus and the optical branching unit have been described as being separately provided, the optical branching unit may be included in the spectrum monitoring apparatus.

Although the present invention has been described above with reference to the embodiments, the present invention is not limited by the foregoing. Various changes in the structure and details of the present invention can be understood by a person skilled in the art within the scope of the invention.

This application claims priority on the basis of Japanese Patent Application No. 2020-38561, filed Mar. 6, 2020, the entire disclosure of which is incorporated herein by reference.

REFERENCE SIGNS LIST 11, 21 OPTICAL BRANCHING SECTIONS
12, 22 OPTICAL TRANSMISSION LINES
13 VARIABLE OPTICAL BAND PASS FILTER
14 LIGHT RECEIVING UNIT
15 CONTROL UNIT
15A WAVELENGTH TABLE
23 OPTICAL SWITCH
100, 200 SPECTRUM MONITORING APPARATUSES
110, 210 OPTICAL REPEATERS
120 OPTICAL AMPLIFIER
F1, F2 OPTICAL FIBERS
1000 OPTICAL COMMUNICATION SYSTEMS
1010, 1020 OPTICAL TRANSMISSION APPARATUSES
1100 OPTICAL CABLE
CON1, CON2 CONTROL SIGNALS
D1, D2 SIGNAL LIGHTS
R1 TO R4 REFERENCE SIGNAL LIGHTS
S1 LEVEL SIGNAL

What is claimed is:

1. A spectrum monitoring apparatus comprising:
a variable optical bandpass filter configured to allow a signal light of a specified wavelength band in a signal light including a reference signal light to pass through, the signal light including the reference signal light being transmitted by an optical fiber included in a submarine optical cable into which a submarine apparatus is inserted;
a light receiving unit configured to receive the signal light that has passed through the variable optical bandpass filter and output a level signal indicating a level of the received signal light; and
a control unit configured to instruct a wavelength band that is allowed to pass through the variable optical bandpass filter by referring to a wavelength table held in advance, and obtain a spectrum of the signal light having passed through the variable optical bandpass filter by using the wavelength table and the level signal, wherein
the control unit:
detects a wavelength drift between the center wavelength of the wavelength band instructed to the variable optical bandpass filter to allow the reference signal light to pass through and a center wavelength of a peak corresponding to the reference signal light in the spectrum; and
updates the wavelength table to correct the detected wavelength drift.

2. The spectrum monitoring apparatus according to claim 1, further comprising an optical branching unit inserted into the optical fiber and configured to branch a part of the signal light including the reference signal light transmitted by the optical fiber to the variable optical bandpass filter.

3. The spectrum monitoring apparatus according to claim 2, further comprising an optical switch inserted between each optical branching unit inserted into each of the plurality of optical fibers and the variable optical bandpass filter and configured to be capable of alternatively selecting an input path of the signal light to the variable optical bandpass filter, wherein
the signal light including the reference signal light is transmitted through a part or all of the plurality of optical fibers.

4. The spectrum monitoring apparatus according to claim 1, wherein the control unit changes the wavelength band of the signal light passing through the variable optical bandpass filter within a range to which the signal light input to the variable optical bandpass filter belongs.

5. The spectrum monitoring apparatus according to claim 1, wherein
the reference signal light is modulated by a predetermined modulation method, and
the control unit recognizes the signal light modulated by the predetermined modulation method as the reference signal light.

6. A submarine apparatus comprising:
an optical branching unit inserted into an optical fiber included in a submarine optical cable and configured to branch a part of a signal light including a reference signal light transmitted by the optical fiber; and
a spectrum monitoring apparatus configured to monitor a spectrum of the signal light including the reference signal light branched by the optical branching unit, wherein
the spectrum monitoring apparatus comprises:
a variable optical bandpass filter configured to allow a signal light of a specified wavelength band in the signal light including the reference signal light to pass through;
a light receiving unit configured to receive the signal light that has passed through the variable optical bandpass filter and output a level signal indicating a level of the received signal light; and
a control unit configured to instruct a wavelength band that is allowed to pass through the variable optical bandpass filter by referring to a wavelength table held in advance, and obtain a spectrum of the signal light having passed through the variable optical bandpass filter by using the wavelength table and the level signal, wherein
the control unit:
detects a wavelength drift between the center wavelength of the wavelength band instructed to the variable optical bandpass filter to allow the reference signal light to pass through and a center wavelength of a peak corresponding to the reference signal light in the spectrum; and
updates the wavelength table to correct the detected wavelength drift.

7. An optical communication system comprising:

a submarine optical cable connecting a first optical transmission apparatus and a second optical transmission apparatus; and a submarine apparatus inserted into the submarine optical cable, wherein the submarine apparatus comprises:

an optical branching unit inserted into an optical fiber included in a submarine optical cable and configured to branch a part of a signal light including a reference signal light transmitted by the optical fiber; and a spectrum monitoring apparatus configured to monitor a spectrum of the signal light including the reference signal light branched by the optical branching unit, wherein the spectrum monitoring apparatus comprises:

a variable optical bandpass filter configured to allow a signal light of a specified wavelength band in the signal light including the reference signal light to pass through;

a light receiving unit configured to receive the signal light that has passed through the variable optical bandpass filter and output a level signal indicating a level of the received signal light; and a control unit configured to instruct a wavelength band that is allowed to pass through the variable optical bandpass filter by referring to a wavelength table held in advance, and obtain a spectrum of the signal light having passed through the variable optical bandpass filter by using the wavelength table and the level signal, wherein the control unit:

detects a wavelength drift between the center wavelength of the wavelength band instructed to the variable optical bandpass filter to allow the reference signal light to pass through and a center wavelength of a peak corresponding to the reference signal light in the spectrum; and updates the wavelength table to correct the detected wavelength drift.

\* \* \* \* \*